United States Patent
Kim et al.

(10) Patent No.: US 7,969,828 B2
(45) Date of Patent: Jun. 28, 2011

(54) OPTICAL PICKUP ACTUATOR AND OPTICAL RECORDING AND/OR REPRODUCING APPARATUS HAVING THE SAME

(75) Inventors: Seok-jung Kim, Suwon-si (KR); Moon-whan Lee, Yongin-si (KR); Do-hoan Nam, Suwon-si (KR); Jung-gug Pae, Suwon-si (KR); Soo-han Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 11/402,990

(22) Filed: Apr. 13, 2006

(65) Prior Publication Data
US 2006/0233067 A1    Oct. 19, 2006

(30) Foreign Application Priority Data
Apr. 14, 2005    (KR) .................. 10-2005-0031093

(51) Int. Cl.
*G11B 7/00*    (2006.01)
*G11B 5/58*    (2006.01)

(52) U.S. Cl. ............... 369/44.14; 369/44.11; 369/44.16; 369/44.21; 369/44.22; 369/44.32; 369/53.19; 720/683

(58) Field of Classification Search .................. 720/683; 369/44.11, 44.14, 44.16, 44.21, 44.22, 44.32, 369/244.1
See application file for complete search history.

(56) References Cited

U.S. PATENT DOCUMENTS

| | | | | |
|---|---|---|---|---|
| 6,744,722 | B2 * | 6/2004 | Choi | 720/683 |
| 7,266,055 | B2 * | 9/2007 | Cho et al. | 369/44.14 |
| 7,619,951 | B2 * | 11/2009 | Kim et al. | 369/44.14 |
| 7,643,386 | B2 * | 1/2010 | Kim et al. | 369/44.15 |
| 2002/0172110 | A1 * | 11/2002 | Tateishi et al. | 369/44.32 |
| 2003/0021218 | A1 * | 1/2003 | Song et al. | 369/244 |
| 2004/0120229 | A1 | 6/2004 | Pae et al. | |
| 2004/0130978 | A1 * | 7/2004 | Hatazawa | 369/44.22 |

(Continued)

FOREIGN PATENT DOCUMENTS

CN    1508779 A    6/2004

(Continued)

OTHER PUBLICATIONS

Office Action issued in Chinese Patent Application No. 2006100743885 on Jun. 29, 2007.

(Continued)

*Primary Examiner* — Wayne R Young
*Assistant Examiner* — Aneeta Yodichkas
(74) *Attorney, Agent, or Firm* — Stanzione & Kim, LLP

(57) ABSTRACT

An optical pickup actuator independently drivable in focusing, tilting and tracking directions. The optical pickup includes a lens holder movably installed on a base, and mounted with an objective lens for transmitting an incident light to an optical information recording medium; and a magnetic circuit to independently driving the lens holder in the focusing, tilting and tracking directions. The magnetic circuit includes opposing magnets; a focusing coil and tilting coils interposed between the magnets, mounted inside the lens holder, and wound around respective axes parallel to the focusing direction; and a plurality of tracking coils mounted outside the lens holder, interposed between the magnets and wound around respective axes transverse to the focusing direction. The magnetic fields of the magnets are guided by outer yokes partially encompassing the magnets and inner yokes positioned within the focusing coil and the tilting coils.

37 Claims, 7 Drawing Sheets

U.S. PATENT DOCUMENTS

| | | | |
|---|---|---|---|
| 2004/0168178 A1* | 8/2004 | Yang et al. | 720/683 |
| 2004/0177365 A1 | 9/2004 | Takeshita et al. | |
| 2004/0264310 A1* | 12/2004 | Hayashi | 369/44.14 |
| 2004/0268373 A1* | 12/2004 | Song et al. | 720/683 |
| 2005/0013211 A1* | 1/2005 | Yamada | 369/44.15 |
| 2006/0136954 A1* | 6/2006 | Kim et al. | 720/683 |
| 2006/0233067 A1* | 10/2006 | Kim et al. | 369/44.14 |

FOREIGN PATENT DOCUMENTS

| | | |
|---|---|---|
| CN | 1542773 A | 11/2004 |
| CN | 1551144 A | 12/2004 |
| EP | 1 411 504 A2 | 4/2004 |
| EP | 1 450 356 A1 | 8/2004 |
| JP | 2003-173556 | 6/2003 |
| JP | 2003-173557 | 6/2003 |
| JP | 2004-110891 | 4/2004 |
| JP | 2004-185654 | 7/2004 |
| JP | 2004-220709 | 8/2004 |
| JP | 2005-63618 | 3/2005 |
| KR | 2004-13327 | 2/2004 |

OTHER PUBLICATIONS

Office Action issued in Korean Patent Application No. 2005-31093 on Aug. 21, 2006.

* cited by examiner

OPTICAL PICKUP ACTUATOR AND OPTICAL RECORDING AND/OR REPRODUCING APPARATUS HAVING THE SAME

CROSS-REFERENCE TO RELATED APPLICATIONS

This application claims the benefit of Korean Application No. 2005-31093, filed Apr. 14, 2005, in the Korean Intellectual Property Office, the disclosure of which is incorporated herein by reference.

BACKGROUND OF THE INVENTION

1. Field of the Invention

Aspects of the present invention relate to an optical pickup which records and/or reproduces information onto and/or from a disc type optical information storage medium. More particularly, aspects of the present invention relate to an optical pickup actuator and an optical recording and/or reproducing apparatus having the same.

2. Description of the Related Art

An optical recording and/or reproducing apparatus is provided with an optical pickup which records optical information on or reproduces the recorded optical information from an optical recording medium by irradiating a laser beam onto the optical recording medium, such as a compact disk (CD), a digital versatile disk (DVD), etc.

The optical pickup requires an objective lens, which focuses an incident light to the optical recording medium, and an actuator, which drives the objective lens in a focusing direction and a tracking direction.

The actuator includes a base, a lens holder on which the objective lens is mounted, and a magnetic circuit for driving the lens holder in the focusing direction and the tracking direction, while supporting the lens holder to move with respect to the base.

The magnetic circuit includes focusing coils driving the objective lens in the focusing direction, tracking coils driving the objective lens in the tracking direction, and magnets installed, facing the coils for interactions. The actuator drives the focusing coils and the tracking coils independently to control movement of the objective lens in the focusing direction and the tracking direction.

In recent years, attention has been focused on developing and establishing a standard for DVDs holding a large amount of data (greater than 4.7 GB per side) and high definition (HD)-DVDs having higher density than the 4.7 GB and capable of recording high definition moving images (greater than 23 GB per side). In case of the high-density optical recording medium, the thickness of an optical recording medium needs to be reduced as the NA (numerical aperture) of an objective lens is increased. For instance, although the thickness of a conventional CD is about 1.2 mm, the thickness of a conventional DVD is about 0.6 mm. Thus, it is highly possible that a next generation HD-DVD may be as thin as about 0.1 mm.

However, as the rotation speed increases, the high-density, thin optical recording medium generates eccentricity problems due to manufacturing errors. As a result of the eccentricity, the optical recording medium may not rotate parallel to a plane, but may deformed in a direction transverse to the plane.

Since focusing control and tracking control of an objective lens in corresponding directions are not sufficient to accurately focus a light to a recording side of an optical disk, there is a need to develop an actuator, which is capable of driving the objective lens not only in the tracking direction, but also in the focusing and tilting directions.

SUMMARY OF THE INVENTION

An aspect of the present invention is to provide an optical pickup actuator with a simple structure, which drives an objective lens in a tilt direction and thus provides high sensitivity, and an optical recording and/or reproducing apparatus having the same.

To achieve the above and/or other aspects and advantages of the present invention, there is provided an optical pickup actuator, including: a base, a lens holder movably installed on the base, and mounted with an objective lens emitting a light to an optical information recording medium, and a magnetic circuit for independently driving the lens holder in a focusing direction, a tilting direction and a tracking direction.

According to an aspect of the present invention, the magnetic circuit includes: a focusing coil installed on the lens holder; a pair of tilting coils installed on the lens holder, and driving independently of each other; at least one pair of tracking coils installed on the lens holder, and driving independently of each other; and magnets interacting with the focusing coil, the tilting coils and the tracking coils, thereby generating a driving force in the focusing direction, the tilting direction and the tracking direction.

The magnets may be arranged on both sides of the lens holder, and may comprise a pair of axially magnetized magnet which are magnetized in unipolar fashion in a perpendicular direction to the tracking direction of the optical information storage medium.

One of the focusing coils may be installed on the lens holder and wound around an axis of the objective lens.

One pair of tilting coils may be installed, and the one pair of tilting coils may be spaced apart by a predetermined distance from each other in a tracking direction of the optical information storage medium.

The focusing coil and the tilting coils may be layered up in the focusing direction.

The focusing coil may be disposed under the tilting coils with respect to the focusing direction, and the focusing coil may have a greater thickness than the tilting coils in the focusing direction.

Operating sides of the focusing coil and the tilting coils may be arranged in parallel with the tracking direction of the optical information storage medium.

The tracking coils may be installed in parallel pairs on outer sides of the lens holder along the tracking direction of the optical information storage medium.

The magnets may comprise a pair of axially magnetized magnets disposed on opposite sides of the lens holder to generate an electromagnetic force to operating sides of the tracking coils which are parallel to the focusing direction.

Each axially magnetized magnet of the pair may be arranged to have a magnetic flux of an opposite direction from the other axially magnetized magnet of the pair.

The magnetic circuit may further include: inner yokes installed inside the focusing coil and the tilting coils; and outer yokes installed outside the focusing coil and the tilting coils.

The outer yokes may be installed on the base and support a respective one of the axially magnetized magnets.

The outer yokes may be installed to partially encompass an exposed outside of each axially magnetized magnet in the tracking direction and thereby provide a magnetic flux of an opposite direction of the axially magnetized magnet.

The outer yokes may be installed to encompass a part of the axially magnetized magnets to generate a driving force in the tracking direction, facing each of the operating sides of the tracking coils, which are spaced apart in the tracking direction, among the operating sides of the adjacent tracking coils.

The inner yokes may comprise: a first inner yoke pair disposed inside the focusing coil and one of the tilting coils; a second inner yoke pair disposed the inside of the focusing coil and the other tilting coil; and a third inner yoke pair disposed between the first and the second inner yoke pairs.

The first, second, and third inner yoke pairs may be arranged at regular intervals in the tracking direction.

The focusing coil and the tilting coils may be attached to an inner wall of the lens holder.

The tracking coils may be installed on outer surfaces of the lens holder.

Another aspect of the present invention provides an optical pickup actuator, including: a base, a lens holder to mount an objective lens for recording and/or reproducing information onto and/or from an optical information storage medium; a support member supporting the lens holder to be movable with respect to a base; and a magnetic circuit independently driving the lens holder in a focusing direction and a tilting direction.

The magnetic circuit may include: a focusing coil wound around the focusing direction; a pair of tilting coils installed on opposite sides of the objective lens on the lens holder and spaced out in a tracking direction of the optical information storage medium; and a pair of axially magnetized magnets installed on opposite sides of the lens holder to be parallel to the tracking direction of the optical information storage medium.

The focusing coil may be layered under the tilting coils with respect to the focusing direction.

The pair of axially magnetized magnets may be arranged so that opposed sides thereof have a same magnetic flux.

The magnetic circuit may further include: two tracking coil pairs, each pair being installed on the opposed sides of the axially magnetized magnets of the lens holder to drive the lens holder in the tracking direction.

The tracking coils may be arranged in such a manner that adjacent sides among parallel sides in the focusing direction function as effective coils by an interaction with the axially magnetized magnets.

The magnetic circuit may further include: three inner yoke pairs installed inside the focusing coil and the tilting coils; and a pair of outer yokes installed on the base and supporting each of the axially magnetized magnets.

A sectional shape of the outer yokes in the focusing direction may be U-shaped to partially encompass the axially magnetized magnets.

Parts extended from the outer yokes to be adjacent to the axially magnetized magnets in the tracking direction may be arranged to face the operating sides of the tracking coils, which are spaced apart in the tracking direction.

Another aspect of the present invention provides an optical recording and/or reproducing apparatus, including: an optical pickup having an objective lens, and an actuator driving the objective lens, the optical pickup moving in a radial direction of an optical information storage medium for recording and/or reproducing information onto and/or from the optical information storage medium; and a controller for controlling a focusing servo, a tracking servo, and a tilting servo of the optical pickup. The actuator may include: a lens holder mounting the objective lens; and a magnetic circuit independently driving the lens holder in a focusing direction, a tilting direction and a tracking direction.

The magnetic circuit may comprise: a pair of tilting coils installed on the lens holder, being spaced away from each other along the tracking direction of the optical information storage medium; a focusing coil installed on the lens holder, being layered under the tilting coils in the focusing direction; a plurality of tracking coil pairs installed on an outside surface of the lens holder and being parallel to the tracking direction; a pair of axially magnetized magnets disposed on both sides of the lens holder to have a magnetic flux of opposite directions; a pair of outer yokes partially encompassing and supporting a part of the axially magnetized magnets; and a plurality of inner yoke pairs disposed inside the focusing coil and the tilting coils and being parallel to the tracking direction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
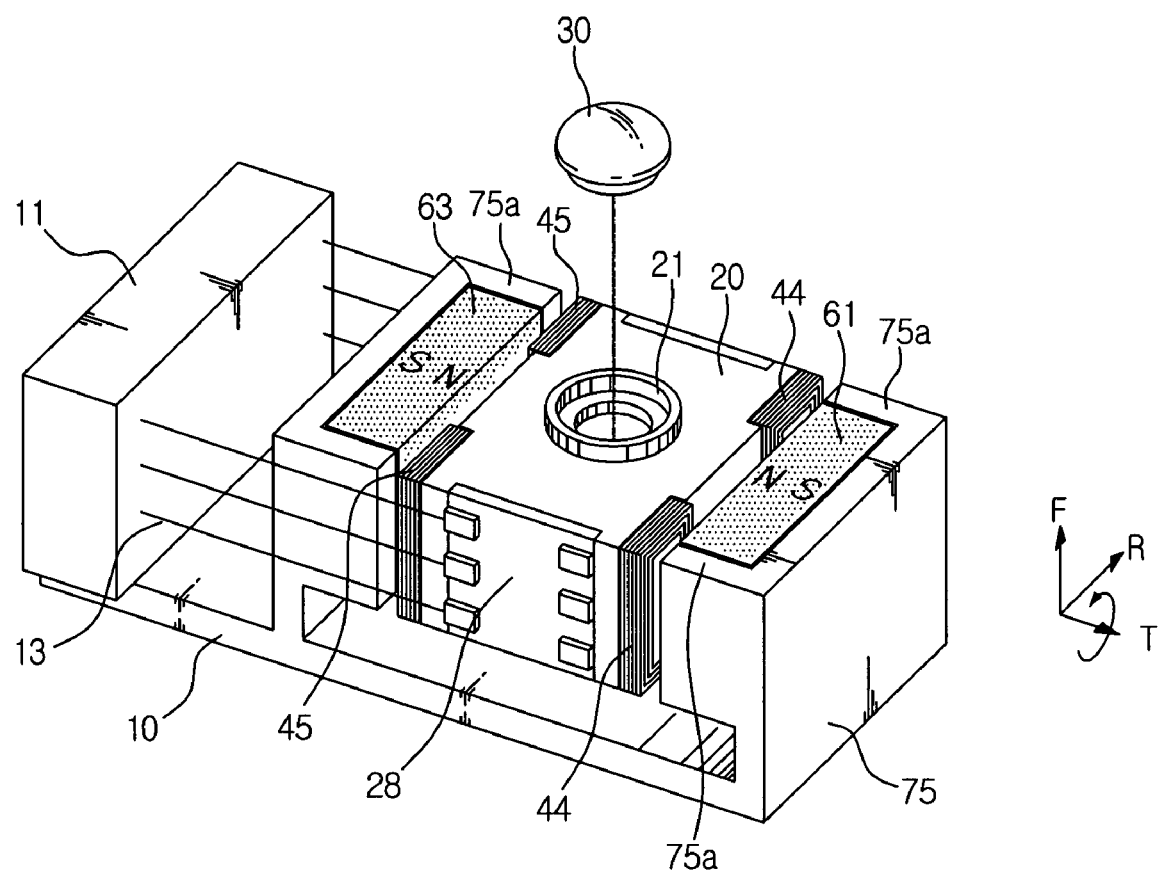
FIG. 1 is a schematic perspective view of an optical pickup actuator according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
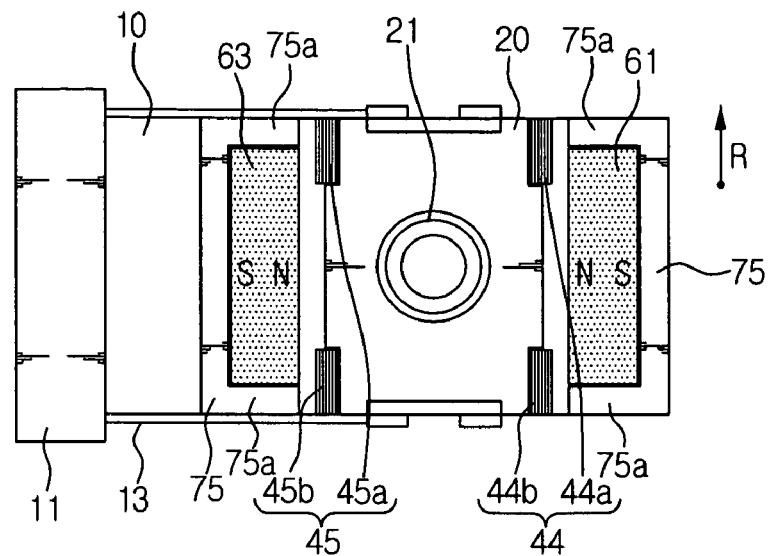
FIG. 2 is a plan view of the optical pickup actuator of FIG. 1.
Figure 3:
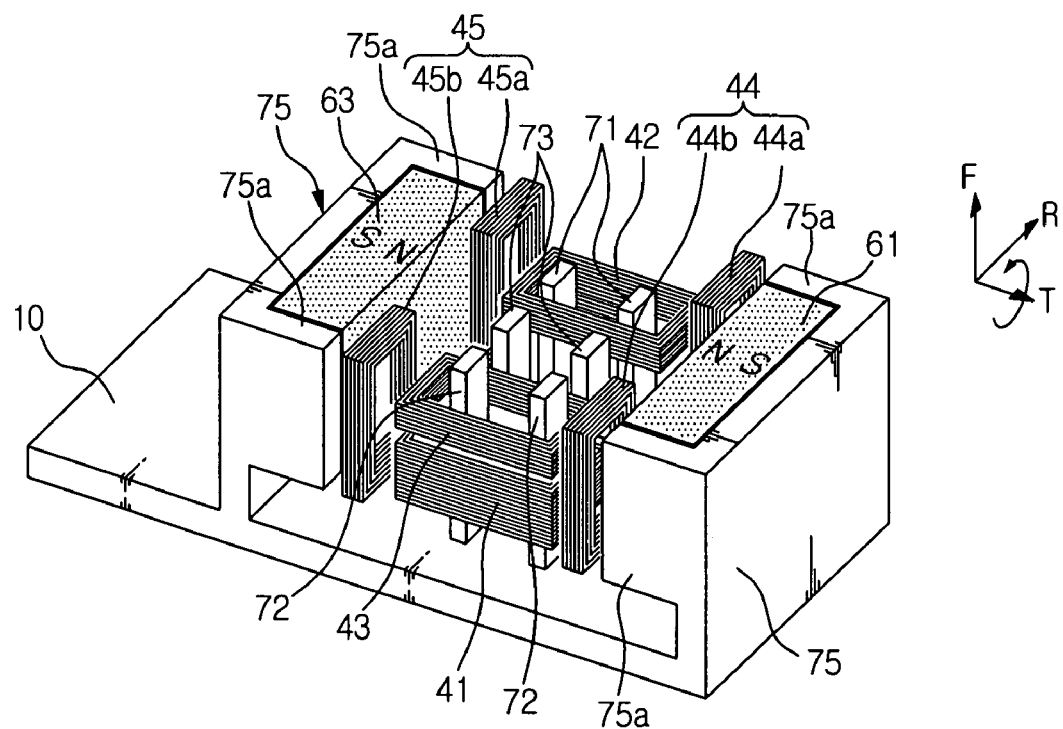
FIG. 3 is a perspective view of a magnetic circuit of the optical pickup actuator of FIG. 1.

Referring to FIGS. 1, 2 and 3, an optical pickup actuator according to an embodiment of the present invention includes a base 10 having a support holder 11, a lens holder 20 having a lens mounting hole 21 formed therein, on which an objective lens 30 is mounted, a suspension or support member 13 connecting the lens holder 20 and the support holder 11, and a magnetic circuit driving the lens holder 20 in a focusing direction F, a tilting direction T, and a radial or tracking direction R independently of each other.

The objective lens 30 is used for recording/reproducing information onto/from an optical disk with a predetermined recording density. The objective lens 30 may be designed to record/reproduce information onto/from a low-density optical disk, such as a DVD or a CD. Also, the objective lens 30 may be designed to record/reproduce information onto/from a higher density optical disk than a DVD, i.e., an HD-DVD or a Blu-Ray disk.

Figure 4:
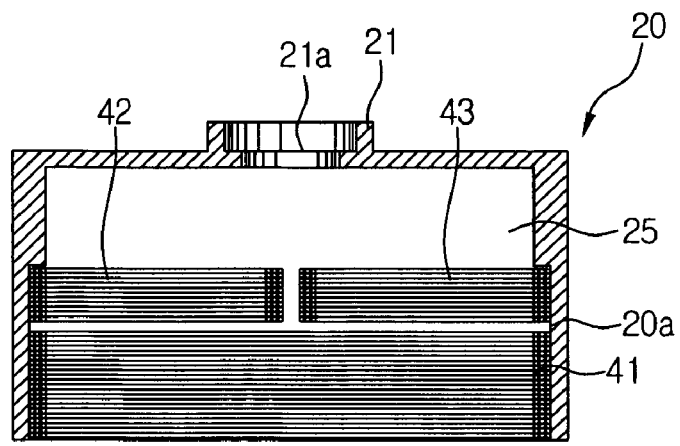
FIG. 4 is a sectional view of a lens holder of FIG. 1.

The lens mounting hole 21 on which the objective lens 30 is mounted is provided at a central part of the lens holder 20. As shown in FIG. 4, a resting shoulder 21a is formed at a relatively deep position of the lens mounting hole 21 from an upper side of the lens holder 20 facing an optical disk (not shown).

In addition, the upper side of the lens holder 20 is opened by the lens mounting hole 21, and a lower side of the lens holder 20 has a hex shaped opening through a coil mounting part 25. A focusing coil 41 and tilting coils 42, 43 are formed inside of the coil mounting part 25. The lens holder 20 may be made of injection molded plastic materials.

The lens holder 20 is movably installed on the support holder 11 by the support member 13. The support member 13 may be formed of elastically transformable spring wires having a predetermined rigidity. A connection board 28 to which the support member 13 is connected is provided on an outer surface of the lens holder 20. For instance, the support member 13 may be soldered to the connection board 28. Thus, a current may be supplied to the magnetic circuit through the support member 13.

The magnetic circuit drives the objective lens 30 independently in the focusing (F), tracking (R) and tilting (T) directions. As shown in FIGS. 2-4, the magnetic circuit includes a focusing coil 41, a pair of tilting coils 42, 43, two pairs of tracking coils 44, 45, and magnets. The magnets may include a pair of unipolar (axially magnetized) magnets 61, 63.

The focusing coil 41 is wound around the objective lens 30 and about an axis parallel to the focusing direction (F). The focusing coil 41 may be wound on a rectangular coil form, and may be closely attached to an inner wall of the coil mounting part 25. The focusing coil may be layered to have a predetermined height in the focusing direction. The focusing coil 41 drives the lens holder 20 in the focusing direction by an interaction between sides of the focusing coil 41 parallel to the R direction and the axially magnetized magnets 61, 63. When a current is applied through the focusing coil 41, the focusing coil 41 moves upwardly or downwardly along the focusing direction according to a direction of current flow through the focusing coil 41, consequently moving the coil mounting part 25 and the objective lens 21 in the focusing direction.

The tilting coils 42, 43 are spaced apart by a predetermined distance in the R direction. And, the tilting coils 42, 43 are arranged on opposite sides of the objective lens 30 to be symmetrical with each other in the R direction, are layered with the focusing coil 41 in the focusing direction, and are wound around respective axes extending in the focusing direction.

These tilting coils 42, 43 are disposed on the focusing coil 41, and are closely adhered to opposite inner walls of the coil mounting part 25. The tilting coils 42, 43 may have a smaller thickness in the focusing direction than the focusing coil 41. Thus, the force being applied in the focusing direction of the lens holder 20 is generated by the focusing coil 41. Moreover, as currents are applied to the tilting coils 42, 43 in opposite directions from each other, each tilting coil 42, 43 generates a force of an opposite direction with respect to the focusing direction. In this manner, the tilting coils 42, 43 are driven independent of the focusing coil 41, and move the lens holder 20 in the T direction using a relatively smaller force than the force generated by the focusing coil 41.

As the focusing coil 41, and the tilting coils 42, 43 are formed in close contact with the inner walls of the coil mounting parts 25 of the lens holder 20, a sidewall 20a of the lens holder 20 can be supported. Therefore, firmness of the sidewall 20a of the lens holder 20 is reinforced, enabling movement of a secondary resonance frequency at a high frequency and sufficient gain margin of the lens holder 20 in driving.

The two pairs of tracking coils 44, 45 are provided on outer surfaces of the lens holder 20 in parallel relation with the R direction. The tracking coil pairs 44, 45 are effective coils whose parallel sides in the F direction are subject to a force in the R direction. The tracking coil pair 44 includes tracking coils 44a and 44b and the tracking coil pair 45 includes tracking coils 45a and 45b. The tracking coils 44a, 45a, face each other having the lens holder 20 therebetween, receive co-directional electrical current and generate force in a same direction. The tracking coils 44b, 45b face each other i having the lens holder 20 therebetween, and generate a force in the same direction when receiving a current in an opposite direction as the tracking coils 44a, 45a.

Figure 7A:
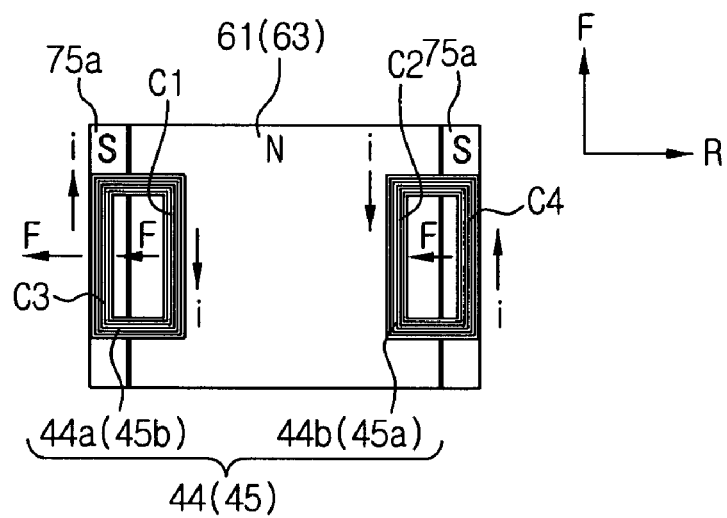
FIG. 7A and FIG. 7B are diagrams explaining a tracking operation in which the lens holder is driven in a tracking direction.
Figure 7B:
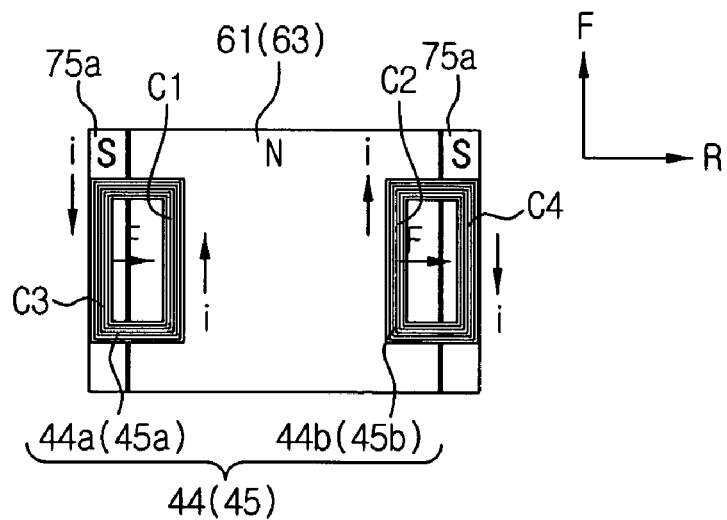

As shown in FIGS. 7A and 7B, operating sides C1, C2 of the tracking coils 44a, 44b, 45a, 45b, which neighbor with each other in the R direction, are arranged to face the axially magnetized magnets 61, 63. The operating sides C3, C4, which are spaced from each other in the R direction, are arranged to face outer yokes 73, which will be described below. According to such structure, a force in the R direction is also generated at the operating sides C3, C4 due to the influence of flux coming out of the axially magnetized magnets 61, 63 and moving toward the neighboring outer yokes 73. That is, suppose that north polarity of each axially magnetized magnet 61, 63 faces the tracking coils 44, 45. Then, the outer yokes 73 function as south polarity magnets. Therefore, the sides C1, C2, C3 and C4 of the tracking coils 44, 45 (FIG. 7A) parallel to the F direction can be used as effective coils, all receiving force in the R direction.

Referring again to FIGS. 2 and 3, the axially magnetized magnets 61, 63 are disposed on opposite sides of the lens holder 20, being parallel with the R direction. The axially magnetized magnets 61, 63 are arranged to have magnetic flux of opposite directions. In the embodiment shown with respect to FIGS. 2 and 3, north polarities of axially magnetized magnets 61, 63 face each other. Both axially magnetized magnets 61, 63 are involved with the independent movements of the lens holder 20 in the focusing, tilting and tracking directions, and the axially magnetized magnets 61, 63 are arranged for common use.

The magnetic circuit includes three inner yoke pairs, i.e., first, second and third inner yoke pairs 71, 72 and 73, respectively, and a pair of outer yokes 75.

The first inner yoke pair 71 is installed inside the tilting coil 42 and the focusing coil 41 on the base 10. The first inner yoke pair 71 may be arranged at the effective coil portion where the focusing coil 41 and the tilting coil 42 face the axially magnetized magnets 61, 63, namely, on opposite sides of an area parallel to the R direction. The first inner yoke pair 71 is made of a suitable material and may be made of a same metallic material as the base 10, thereby being one body together. The first inner yoke pair 71, while being separated from the focusing coil 41 and the tilting coil 42, guides the lines of magnetic flux generated from the focusing coil 41 and the tilting coil 42 in the F and R directions to maximize an intensity of an effective magnetic field.

The second inner yoke pair 72 is spaced apart by a predetermined distance from the first inner yoke pair 71 in the R direction. The second inner yoke pair 72 is disposed inside of the focusing coil 41 and the tilting coil 43. However, the configuration and function of the second inner yoke pair 72 are similar to the configuration and function of the first inner yoke pair 71 and a detailed description thereof will not be repeated.

The third inner yoke pair 73 is disposed between the first inner yoke pair 71 and the second inner yoke pair 72. The third inner yoke pair 73 faces sides of the focusing coil 41 which are parallel to the R direction. Thus, the third inner yoke pair guides the lines of magnetic flux generated from the focusing coil 41 in the F direction to maximize the intensity of an effective magnetic field. The third inner yoke pair 73 may be made of a same material and shape as the first inner yoke pair 71. The base 10 may be separately formed or may be integrally formed with one, two or all of the first, second and third inner yoke pairs.

The inner yoke pairs 71, 72, and 73 are installed by insertion through the opened bottom of the lens holder 20, that is a side opposite the lens hole 21, and the inner yoke pairs 71, 72 and 73 remain separated inside the lens holder 20.

The outer yoke pair 75 is fixed at the base 10, and may be connected to the base 10 as one body. The outer yokes 75 are arranged on a surface of each of the axially magnetized magnets 61, 63 that faces away from the lens holder 20. One of the outer yoke pair 75 supports each axially magnetized magnet 61, 63, respectively. The outer yoke pair 75 guides the lines of magnetic flux generated from each axially magnetized magnet 61, 63, and focuses the magnetic flux to the lens holder 20, thereby maximizing the intensity of an effective magnetic field.

A sectional shape of the outer yokes may be "U" shaped. That is, each yoke of the outer yoke pair 75 has a pair of extended parts 75a that extend in a direction perpendicular to the F direction to partially encompass opposite sides of a respective one of the axially magnetized magnets 61, 63. As shown in FIG. 7A, the extended parts 75a are installed, facing the sides C3, C4 which are separated from each other in the R direction of the tracking coils 44, 45. Therefore, the sides C1, C2 adjacent to the tracking coils 44, 45 receive force generated from the interaction between the tracking coils 44, 45 and the axially magnetized magnets 61, 63, whereas the sides C3, C4 receive force in the R direction by a magnetic force applied to each extended part 75a. In the embodiment of the present invention, since north (N) polarity of each axially magnetized magnet 61, 63 is faced with the tracking coils 44, 45, the adjacent extended parts 75a in the R direction bear south (S) polarities. Therefore, by partially encompassing the outsides of the axially magnetized magnets 61, 63 in the tracking direction by extending the outer yokes, the force that the tracking coils 44, 45 receive in the R direction increases.

Figure 5A:
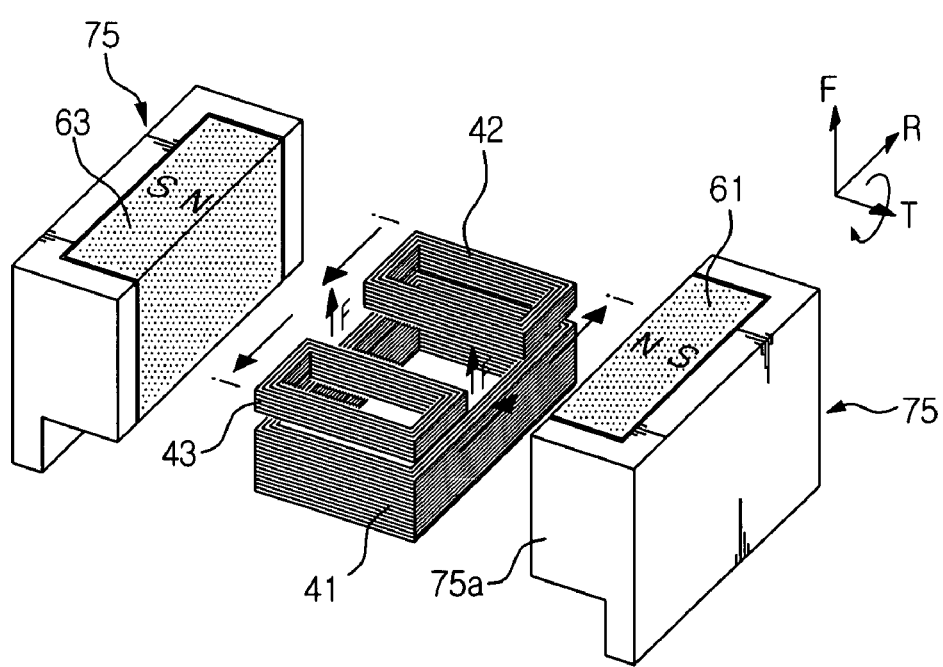
FIG. 5A and FIG. 5B are diagrams for explaining a focusing operation in which the lens holder is driven in a focusing direction.

Detailed operational effects of the optical pickup actuator according to the embodiment of the present invention shown in FIG. 3 will now be described. First, the direction of a driving force generated by an interaction between the focusing coil 41 and the axially magnetized magnets 61, 63 is described. As can be seen in FIG. 5A, the focusing coil 41 is disposed between the axially magnetized magnets 61, 63. As shown in the drawing, if seen from the top, a current is applied to the focusing coil 41 in the counterclockwise direction. Since the north polarity of the axially magnetized magnet 61 faces the north polarity of the axially magnetized magnet 63, the corresponding magnetic fields repel each other Where a current is applied to the focusing coil 41 in a counterclockwise direction, the sides of the focusing coil 41 parallel to the R direction receive force upwardly, according to Fleming's left hand rule. Consequently, as depicted in FIG. 5A, the lens holder 20 and the objective lens 30, and the driving unit including the focusing coil 41, the tilting coils 42, 43 and the tracking coils move upwardly by the force (F) applied to the focusing coil 41.

Figure 5B:
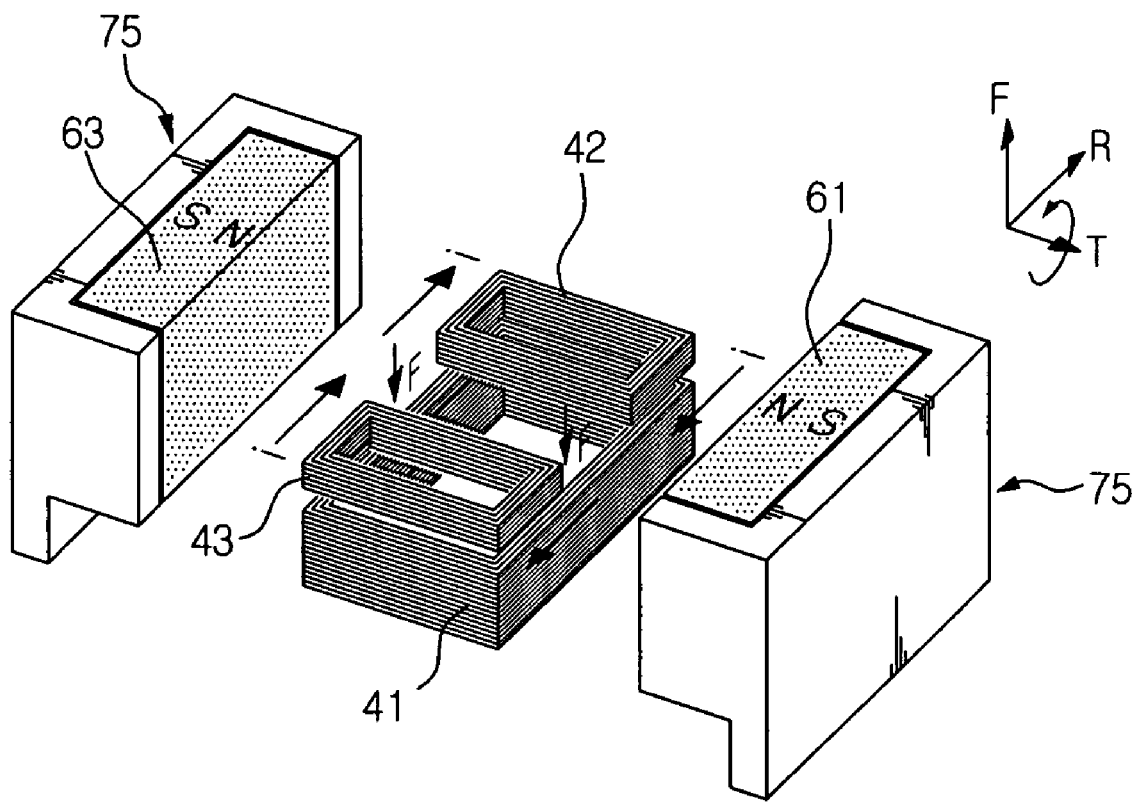

Referring to FIG. 5B, where a current is applied to the focusing coil 41 in a clockwise direction, the sides of the focusing coil 41 in parallel with the R direction receives force downwardly. Therefore, the position of the object lens 30 on the lens holder 20 in the F direction is adjustable by controlling the polarity and amount of a current applied to the focusing coil 41.

Figure 6A:
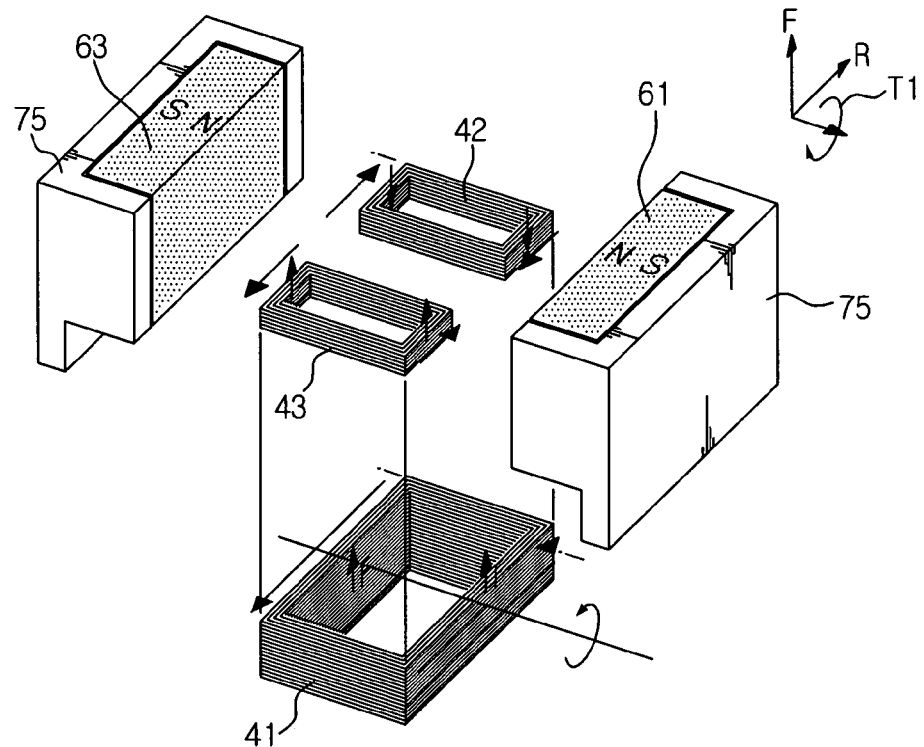
FIG. 6A and FIG. 6B are diagrams explaining a focusing and a tilting operation in which the lens holder is driven in a focusing direction and a tilting direction, respectively.

Referring to FIG. 6A, a current is applied to the focusing coil 41 to drive the lens holder 20 upwardly, similar to FIG. 5A. At the same time, currents of opposite directions are applied to the tilting coils 42, 43. Then, the tilting coils 42, 43 receive force of the opposite directions with respect to the axially magnetized magnets 61, 63, respectively. That is, the tilting coil 42 to which a current is applied in the clockwise direction receives a downwardly applied force with respect to the focusing direction. On the other hand, the tilting coil 43 to which a current is applied in the counterclockwise direction receives an upwardly applied force. Therefore, each tilting coil 42, 43 is driven independently of the focusing coil 41, thereby tilting the lens holder 20 in the T1 direction.

Figure 6B:
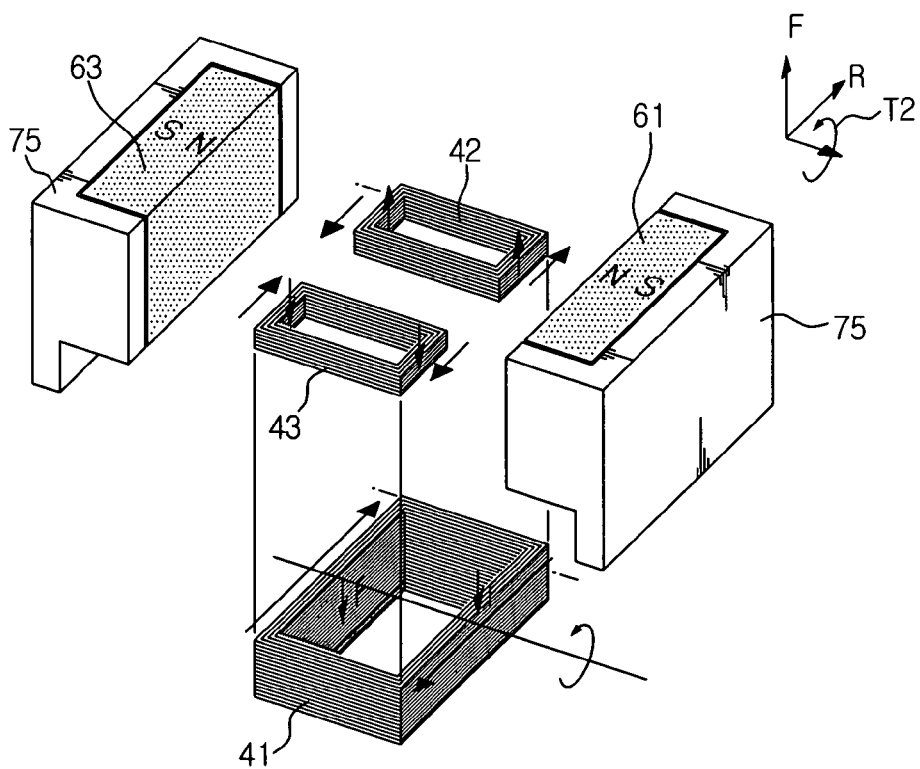

As shown in FIG. 6B, the lens holder 20 can be driven downwardly in the focusing direction by applying a current to the focusing coil 41 in the same direction as shown in FIG. 5B. Where currents are applied to the tilting coils 42, 43, respectively, in the opposite directions from the directions shown in FIG. 6A, the tilting coil 42 receives an upwardly applied force, whereas the tilting coil 43 receives a downwardly applied force. Therefore, the lens holder 20 is driven downwardly by the focusing coil 41 and at the same time, the lens holder 20 is tilted in the T2 direction by the tilting coils 42, 43.

Thus, in order to tilt the objective lens 30 mounted on the lens holder 20 in the tilting direction while moving the objective lens 30 in the focusing direction, it is necessary to apply a current to the focusing coil 41, and adjust the polarity and amount of a current that is applied to each of the tilting coils 42, 43 in an opposite direction from each other. The lens holder 20 can also be tilted by applying currents of opposite directions to the tilting coils 42, 43 only, without applying a current to the focusing coil 41.

A tracking operation in which the lens holder 20 is driven in the tracking direction by an interaction between the tracking coils 44, 45 and the axially magnetized magnets 61, 63, respectively, will now be described.

As can be seen in FIG. 7A, the axially magnetized magnets 61, 63 facing two pairs of tracking coils 44, 45 are arranged in such a manner that the north polarities of the magnets 61 and 63 face with each other. In this state, each tracking coil pair 44a, 44b, and 45a, 45b has long sides C1, C2, C3 and C4 in the F direction. Among the long sides C1-C4, the adjacent sides C1, C2 are arranged to face north polarities of the axially magnetized magnets 61, 63, whereas the other sides C3, C4 are arranged to face the extended parts 75a of the outer yoke pair 75 corresponding to south polarity.

Next, currents of opposite directions are applied to the tracking coil pairs 44a, 44b, and 45a, 45b, respectively, as shown in FIG. 7A. Then, currents are equally applied to the adjacent sides C1, C2 in the downward direction, whereas currents are applied to the sides C3, C4, which are spaced apart, in the upward direction. Here, suppose that the direction of a magnetic field from the axially magnetized magnets 61, 63 is in the F direction. Then, each side C1, C2, C3 and C4 receives force in a direction opposite the R direction.

As shown in FIG. 7B, where currents are applied to the tracking coil pairs 44*a*, 44*b*, and 45*a*, 45*b*, respectively, in opposite directions from the directions shown in FIG. 7A, force in the direction R is generated to each side C1, C2, C3 and C4.

Therefore, the object lens 30 mounted on the lens holder 20 may be driven in the R direction, according to the polarity and amount of a current applied to the tracking coils 44, 45.

As set forth above, the focusing coil 41 and the tilting coils 42, 43 are independently installed and driven to control the lens holder 20 in the focusing and tilting directions. In this way, the adaptability of the objective lens to the system, and the sensitivity of the optical pickup may be improved.

Moreover, the rigidity of the injection molded lens holder may be reinforced by tightly attaching the focusing coil and the tilting coils to the inside of the lens holder. Hence, the sensitivity of the optical pickup can be increased even at a high speed, and the movement of a secondary resonant frequency at a high frequency is secured sufficiently.

Figure 8:
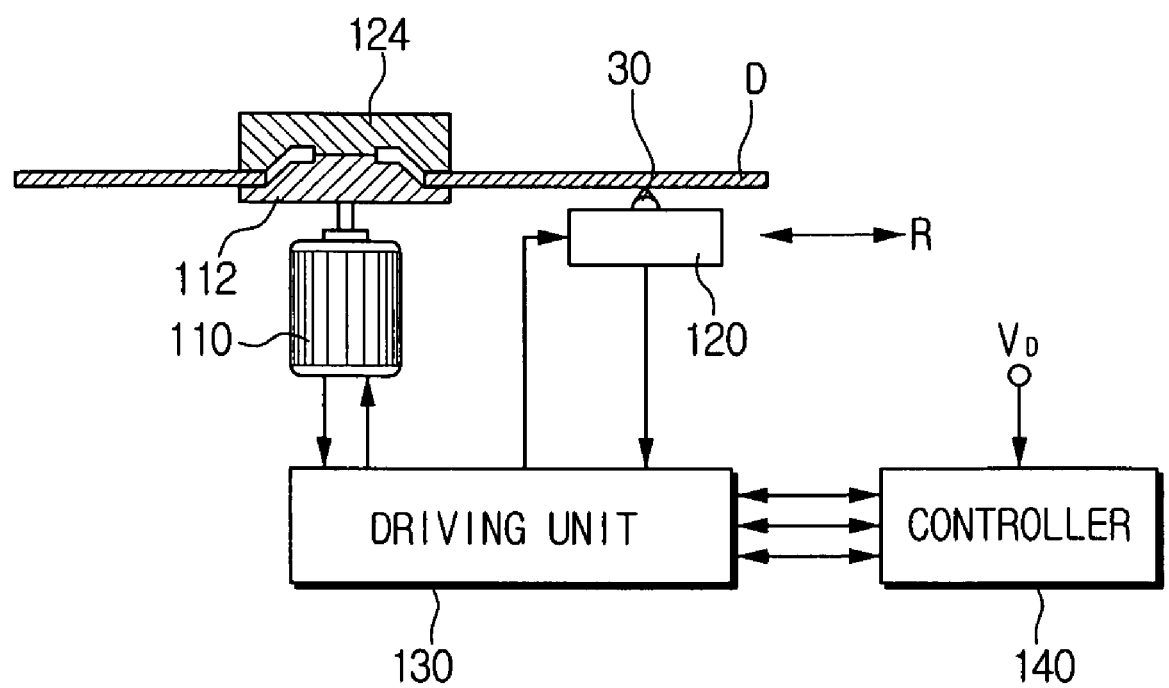
FIG. 8 is a schematic diagram of an optical recording and/or reproducing apparatus having an optical pickup actuator according to an embodiment of the present invention.

FIG. 8 is a schematic diagram showing an optical recording and/or reproducing apparatus to which the optical pickup actuator according to embodiments of the present invention may be applied.

Referring to FIG. 8, the optical recording and/or reproducing apparatus includes a spindle motor 110 rotating an optical medium such as an optical disk D, an optical pickup 120 movably installed in the radial direction of the optical medium D recording and/or reproducing information onto and/or from the optical medium D, a driving unit 130 driving the spindle motor 110 and the optical pickup 120, and a controller 140 controlling a focusing servo, a tracking servo and a tilting servo of the optical pickup 120. As shown in FIG. 8, the optical medium D is chucked to a turntable 112 by a clamp 124.

The optical pickup 120 includes an optical pickup system comprising an object lens 30 focusing a light emitted from a light source onto the optical medium, and an optical pickup actuator driving the object lens 30 about three axes. The optical pickup actuator described with respect to FIGS. 1-7B may be adopted to the optical recording/reproducing apparatus shown in FIG. 8.

In the optical recording/reproducing apparatus, a reflected light from the optical medium D is detected through a photodetector provided to the optical pickup 120, and undergoes photoelectric transformation to become an electrical signal Vp. The electrical signal Vp is input to the controller 140 through the driving unit 130. The driving unit 130 controls rotation speed of the spindle motor 110, amplifies an input signal, and drives the optical pickup 120.

The controller 140 sends a focusing servo command, a tracking servo command, and a tilting servo command, each being adjusted based on an input signal from the driving unit 130, to the driving unit 130 again to realize the focusing, tracking and tilting operations of the optical pickup 120.

Although the embodiments of the present invention described herein disclose the actuator with one objective lens 30 for one lens holder 20, a number of objective lenses may be increased. For example, two lens mounting holes may be formed in the lens holder 20, and an objective lens mounted on only one of the holes, or a plurality of objective lenses may be mounted on the two lens mounting holes. The magnetic circuit may be effectively used in this case as well, to adjust the position of the objective lens being used in a particular application.

In a case where more than two objective lenses are mounted on the lens holder 20, the actuator thereof can be applied to an optical pickup operating compatibly with a plurality of kinds of optical disks, such as, CD, DVD, and HD-DVD, for recording/reproducing information.

In conclusion, the optical pickup actuator according to embodiments of the present invention independently controls the objective sensor lenses in the focusing, tilting and tracking directions. Therefore, adaptability at a high speed is improved, and the sensitivity of the optical pickup can be improved. Moreover, the rigidity of the injection molded lens holder is reinforced by tightly attaching the focusing coil and the tilting coils to the inside of the lens holder. Hence, it becomes possible to secure the gain margin and the movement of a secondary resonant frequency (which is caused due to physical properties of the lens holder) at a high frequency. Overall, the optical pickup actuator of the present invention may be advantageously used for a high-speed optical recording/reproducing apparatus.

The foregoing embodiments and advantages are merely exemplary and are not to be construed as limiting the present invention. The present teaching can be readily applied to other types of apparatuses. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup actuator, comprising:
   a base;
   a lens holder movably installed on the base, and mounted with an objective lens emitting a light to an optical information recording medium; and
   a magnetic circuit independently driving the lens holder in a focusing direction, a tilting direction and a tracking direction,
   wherein the magnetic circuit comprises:
      a focusing coil installed on the lens holder;
      no more than a pair of tilting coils installed on the lens holder, and driving independently of each other;
      at least one pair of tracking coils installed on the lens holder, and driving independently of each other;
      outer yokes installed outside the focusing coil and outside the tilting coils; and
      inner yokes installed inside the focusing coil and inside the tilting coils, wherein the inner yokes comprise:
         a first inner yoke pair disposed inside one of the pair of tilting coils;
         a second inner yoke pair disposed inside the other one of the pair of tilting coils, and
         a third inner yoke pair disposed between the first inner yoke pair and the second inner yoke pair; and
      magnets interacting with the focusing coil, the tilting coils and the tracking coils, to generate driving forces in the focusing direction, the tilting direction and the tracking direction,
   wherein the focusing coil and the tilting coils are tightly attached to an inner wall of the lens holder so that the rigidity of the lens holder is reinforced, and
   wherein the focusing coil and the tilting coils are vertically layered with respect to one another in the focusing direction within the lens holder such that the tilting coils are positioned above the focusing coil.

2. The optical pickup actuator according to claim 1,
   wherein the magnets are arranged on opposite sides of the lens holder and comprise:
   a pair of axially magnetized magnets which are magnetized in unipolar fashion in a perpendicular direction to the tracking direction of the optical information storage medium and are arranged on opposite sides of the lens holder.

3. The optical pickup actuator according to claim 1, wherein the focusing coil is around an axis parallel to the focusing direction.

4. The optical pickup actuator according to claim 1, wherein the tilting coils are spaced apart by a predetermined distance from each other in a tracking direction of the optical information storage medium.

5. The optical pickup actuator according to claim 1, wherein the focusing coil is disposed more distant from the objective lens in the focusing direction than the tilting coils.

6. The optical pickup actuator according to claim 1, wherein the focusing coil has a greater thickness in the focusing direction than a thickness of the tilting coils.

7. The optical pickup actuator according to claim 1, wherein operating sides of the focusing coil and the tilting coils are arranged in parallel with the tracking direction of the optical information storage medium.

8. The optical pickup actuator according to claim 1, wherein the tracking coils are installed in pairs on opposite outer sides of the lens holder along the tracking direction of the optical information storage medium.

9. The optical pickup actuator according to claim 8, wherein:
the tracking coils have respective sides parallel to the focusing direction; and
the magnets comprise a pair of axially magnetized magnets respectively disposed adjacent the opposite outer sides of the lens holder to generate an electromagnetic force to the tracking coils.

10. The optical pickup actuator according to claim 9, wherein each axially magnetized magnet is arranged to have a magnetic flux of opposite direction from the other axially magnetized magnet.

11. The optical pickup actuator according to claim 1, wherein the outer yokes are installed on the base and support the axially magnetized magnets, respectively.

12. The optical pickup actuator according to claim 11, wherein:
each axially magnetized magnet has an inner side facing the inner yokes and an outer side; and
each outer yoke is installed to provide a magnetic flux toward the inner yokes.

13. The optical pickup actuator according to claim 11, wherein:
the outer yokes partially encompass a part of the axially magnetized magnets and are spaced apart with respect to the tracking direction, to generate a driving force on the tracking coils.

14. The optical pickup actuator according to claim 1, wherein the first, second, and third inner yoke pairs are arranged at regular intervals in the tracking direction.

15. The optical pickup actuator according to claim 1, wherein the tracking coils are installed on outer sides of the lens holder.

16. The optical pickup actuator according to claim 1, wherein:
the focusing coil is and the lens holder are formed so that the focusing coil reinforces a sidewall of the lens holder.

17. An optical pickup actuator, comprising:
a base;
a lens holder mounted on the base, and adapted to receive an objective lens for recording and/or reproducing information onto and/or from an optical information storage medium;
a support member supporting the lens holder to be movable with respect to the base; and
a magnetic circuit independently driving the lens holder in a focusing direction and a tilting direction;
wherein the magnetic circuit comprises:
a focusing coil installed within and on the lens holder;
no more than a pair of tilting coils installed within and on the lens holder, and driving independently of each other;
at least one pair of tracking coils installed on the lens holder, and driving independently of each other;
magnets interacting with the focusing coil, the tilting coils and the tracking coils, to generate driving forces in the focusing direction, the tilting direction and the tracking direction;
outer yokes installed outside the focusing coil and outside the tilting coils; and
inner yokes installed inside the focusing coil and inside the tilting coils, wherein the inner yokes comprise:
a first inner yoke pair disposed inside one of the pair of tilting coils;
a second inner yoke pair disposed inside the other one of the pair of tilting coils, and
a third inner yoke pair disposed between the first inner yoke pair and the second inner yoke pair,
wherein the focusing coil and the tilting coils are tightly attached to an inner wall of the lens holder so that the rigidity of the lens holder is reinforced; and
wherein the focusing coil and the tilting coils are vertically layered with respect to one another in the focusing direction within the lens holder such that the tilting coils are positioned above the focusing coil.

18. The optical pickup actuator according to claim 17, wherein:
the focusing coil is wound around an axis parallel to the focusing direction;
the magnets comprise a pair of axially magnetized magnets installed having opposed sides adjacent the lens holder and spaced apart in the tracking direction of the optical information storage medium; and
the magnetic circuit further comprises a pair of tilting coils installed on opposite sides of the lens holder and spaced apart in a tracking direction of the optical information storage medium.

19. The optical pickup actuator according to claim 18, wherein the focusing coil is layered adjacent the tilting coils with respect to the focusing direction.

20. The optical pickup actuator according to claim 18, wherein the pair of axially magnetized magnets are arranged such that the opposed sides thereof have a same magnetic flux direction.

21. The optical pickup actuator according to claim 18, wherein the at least one pair of tracking coils comprise:
two tracking coil pairs, each pair being installed along one of the opposed sides of the axially magnetized magnets to drive the lens holder in the tracking direction.

22. The optical pickup actuator according to claim 21, wherein the tracking coils are arranged such that adjacent sides of the tracking coils among parallel sides in the focusing direction function as effective coils by an interaction with the axially magnetized magnets.

23. The optical pickup actuator according to claim 22, wherein the magnetic circuit further comprises:
- three inner yoke pairs installed inside the focusing coil and the tilting coils, respectively, on the base; and
- a pair of outer yokes installed on the base, each outer yoke supporting a respective one of the axially magnetized magnets.

24. The optical pickup actuator according to claim 23, wherein the sectional shape of each outer yoke in the focusing direction is U-shaped to partially encompass a respective one of the axially magnetized magnets.

25. The optical pickup actuator according to claim 24, wherein extended parts of the outer yokes are arranged to face the tracking coils.

26. An optical recording and/or reproducing apparatus, comprising:
- an optical pickup comprising:
  - an objective lens, and
  - an actuator driving the objective lens, the optical pickup moving in a radial direction of an optical information storage medium for recording and/or reproducing information onto and/or from the optical information storage medium; and
- a controller controlling a focusing servo, a tracking servo, and a tilting servo of the optical pickup, wherein the actuator comprises:
- a lens holder mounting the objective lens, and
- a magnetic circuit independently driving the lens holder in a focusing direction, a tilting direction and a tracking direction, respectively, wherein the magnetic circuit comprises:
  - a focusing coil installed within and on the lens holder;
  - a pair of tilting coils installed within and on the lens holder, and driving independently of each other;
  - at least one pair of tracking coils installed on the lens holder, and driving independently of each other; and
  - magnets interacting with the focusing coil, the tilting coils and the tracking coils, to generate driving forces in the focusing direction, the tilting direction and the tracking direction, wherein the focusing coil and the tilting coils are tightly attached to an inner wall of the lens holder so that the rigidity of the lens holder is reinforced;
  - outer yokes installed outside the focusing coil and outside the tilting coils; and
  - inner yokes installed inside the focusing coil and inside the tilting coils, wherein the inner yokes comprise:
    - a first inner yoke pair disposed inside one of the pair of tilting coils;
    - a second inner yoke pair disposed inside the other one of the pair of tilting coils, and
    - a third inner yoke pair disposed between the first inner yoke pair and the second inner yoke pair,
  - wherein the focusing coil and the tilting coils are vertically layered with respect to one another in the focusing direction such that the tilting coils are positioned above the focusing coil.

27. The apparatus according to claim 26, wherein:
the pair of tilting coils is spaced away from each other along the tracking direction of the optical information storage medium;
the focusing coil is layered more remotely from the objective lens in focusing direction than the tilting coils;
the magnets comprise a pair of axially magnetized magnets disposed on opposite sides of the lens holder to have a magnetic flux of opposite directions; and
wherein the magnetic circuit further comprises:
- a plurality of tracking coil pairs installed on respective outside surfaces of the lens holder and parallel to the tracking direction;
- a pair of outer yokes partially encompassing and supporting a part of the axially magnetized magnets; and
- three inner yoke pairs disposed on the inside of the focusing coil and the tilting coils and being parallel to the tracking direction.

28. The apparatus according to claim 26, wherein:
the first and second tilting coils are wound around first and second axes parallel to the focusing direction;
the focusing coil is wound around a third axis parallel to the focusing direction;
the at least one pair of tracking coils comprise a plurality of tracking coils installed on the lens holder and wound around respective axes transverse to the focusing direction; and
the magnets comprise a pair of magnets disposed on opposite sides of the lens holder and interacting with respective magnetic fields generated by currents flowing through the focusing coil, the tilting coils, and the tracking coils to move the lens holder in the focusing direction, the tilting direction and the tracking direction.

29. The apparatus according to claim 26, wherein:
the tracking coils comprise first and second tilting coils installed on the lens holder and wound around second and third axes parallel to the focusing direction, the second and third axes being on opposite sides of the first axis;
the at least one pair of tracking coils comprise a plurality of tracking coils installed on the lens holder and wound around respective axes transverse to the focusing direction; and
the magnets comprise a pair of magnets disposed on opposite sides of the lens holder and interacting with respective magnetic fields generated by currents flowing through the focusing coil, the tilting coils, and the tracking coils to move the lens holder in the focusing direction, the tilting direction and the tracking direction.

30. The apparatus according to claim 29, wherein:
each magnet has a first pole disposed adjacent the lens holder and a second pole; and
the magnetic circuit further comprises a plurality of outer yokes which shunt magnetic flux of each second pole to flow through respective regions adjacent a corresponding magnet in the tracking direction.

31. The apparatus according to claim 29, wherein:
each outer yoke is U-shaped such that a central portion of the corresponding magnet has the first pole and the second pole exists at opposite sides of the corresponding magnet in the tracking direction.

32. The apparatus according to claim 31, wherein the magnetic circuit further comprises:
first, second and third inner yoke pairs extending in the focusing direction, wherein:
the first, second and third inner yoke pairs are encompassed by the focusing coil; the first inner yoke pair is encompassed by one of the tilting coils; and
the second inner yoke pair is encompassed by the other of the tilting coils.

33. The apparatus according to claim 32 wherein the magnets are axially magnetized.

34. An optical pickup actuator, comprising:
a base;
a lens holder within the base including an objective lens, the lens holder further comprising:

a focusing coil and a plurality of tilting coils surrounding the two pairs of inner yokes;

inner yokes installed inside the focusing coil and inside the tilting coils, wherein the inner yokes comprise:

a first inner yoke pair disposed inside one of the plurality of tilting coils;

a second inner yoke pair disposed inside the other one of the plurality of tilting coils, and a third inner yoke pair disposed between the first inner yoke pair and the second inner yoke pair a plurality of tracking coils disposed on the lens holder;

a plurality of outer yokes disposed outside of the lens holder, outside of the focusing coil and outside of the plurality of tilting coils, the plurality of outer yokes comprising a wall portion and two extended side portions to form a U-shaped cavity;

a plurality of magnets disposed within the U-shaped cavity, wherein current is passed through the focusing coils, tilting coils and tracking coils to adjust positioning of the lens holder.

35. The optical pickup actuator of claim 34, wherein the three pairs of inner yokes are provided separately from the base.

36. The optical pickup actuator of claim 34, wherein the plurality of tilting coils is not greater than two coils.

37. A magnetic circuit in a lens holder to be used in an optical pickup actuator, the magnetic circuit comprising:

a focusing coil installed on the lens holder;

a pair of tilting coils installed on the lens holder, and driving independently of each other;

at least one pair of tracking coils installed on the lens holder, and driving independently of each other;

outer yokes installed outside the focusing coil and outside the tilting coils;

inner yokes installed inside the focusing coil and inside the tilting coils, the inner yokes comprising:

a first inner yoke pair disposed inside one of the pair of tilting coils;

a second inner yoke pair disposed inside the other one of the pair of tilting coils; and a third inner yoke pair disposed between the first inner yoke pair and the second inner yoke pair; and magnets interacting with the focusing coil, the tilting coils and the tracking coils to generate driving forces in the focusing direction, the tilting direction and the tracking direction, wherein the magnetic circuit independently drives the lens holder in a focusing direction, a tilting direction and a tracking direction.

* * * * *